United States Patent
Thompson et al.

(10) Patent No.: US 6,845,440 B2
(45) Date of Patent: Jan. 18, 2005

(54) SYSTEM FOR PREVENTING MEMORY USAGE CONFLICTS WHEN GENERATING AND MERGING COMPUTER ARCHITECTURE TEST CASES

(75) Inventors: Ryan C. Thompson, Fort Collins, CO (US); John W. Maly, LaPorte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 10/291,936

(22) Filed: Nov. 11, 2002

(65) Prior Publication Data

US 2004/0093476 A1 May 13, 2004

(51) Int. Cl.$^7$ .............................................. G06F 12/00
(52) U.S. Cl. ...................... 711/220; 711/170; 711/173; 703/20; 703/21
(58) Field of Search .................................. 711/170, 173, 711/201, 220; 703/20, 21

(56) References Cited

U.S. PATENT DOCUMENTS

2001/0054121 A1 * 12/2001 Proch et al. ................... 710/57

* cited by examiner

Primary Examiner—Jack Lane

(57) ABSTRACT

A system for detecting/avoiding memory usage conflicts when generating and merging multi-threaded software test cases. Initially, a test case generator is given a unique segment of memory which it can use. A plurality of test cases are generated, one at a time, by the test case generator. When the first test case is generated, the memory segment used is noted. When each of the second through Nth test cases is generated, a memory segment of the same size as the first test case, but not overlapping that of the previously assigned test case(s), is assigned to each subsequent test case.

16 Claims, 3 Drawing Sheets

SYSTEM FOR PREVENTING MEMORY USAGE CONFLICTS WHEN GENERATING AND MERGING COMPUTER ARCHITECTURE TEST CASES

TECHNICAL FIELD

The present invention relates generally to computer systems, and more particularly, to a system for preventing memory usage conflicts when generating and merging test cases used in the development and testing of computer processor architectures.

Statement of the Problem

When generating computer processor architecture test cases for an N-threaded processor architecture, it is desirable to generate test cases with N separate executable code streams, i.e., one code stream for each thread. Previously existing methods for generating N-threaded test cases typically separately generate N single-threaded test cases and merge them into one test case. When these methods are employed, the N test cases which are merged must not share any memory space, otherwise the desired behavior of the individual test cases will not occur. Therefore, each individual test case must be generated and then checked to see whether any of the used memory segments overlap. If any overlap occurs, the test cases cannot be merged, and the test cases are then generated again. Since memory allocation performed by presently existing tools is a random process, closure may never be reached, and thus a need exists for a method to assure that memory overlap between the test cases doe not occur when the cases are generated.

Solution to the Problem

The present system overcomes the aforementioned problems of the prior art and achieves an advance in the field by providing a system for generating and merging multi-threaded computer processor architecture test cases. Initially, a test case generator is given a unique segment of memory which it can use. A plurality of test cases are generated, one at a time, by the test case generator. When the first test case is generated, the memory segment used is noted. When each of the second through Nth test cases is generated, a memory segment of the same size as the first test case, but not overlapping that of the previously assigned test case(s), is assigned to each subsequent test case.

DETAILED DESCRIPTION

Figure 1:
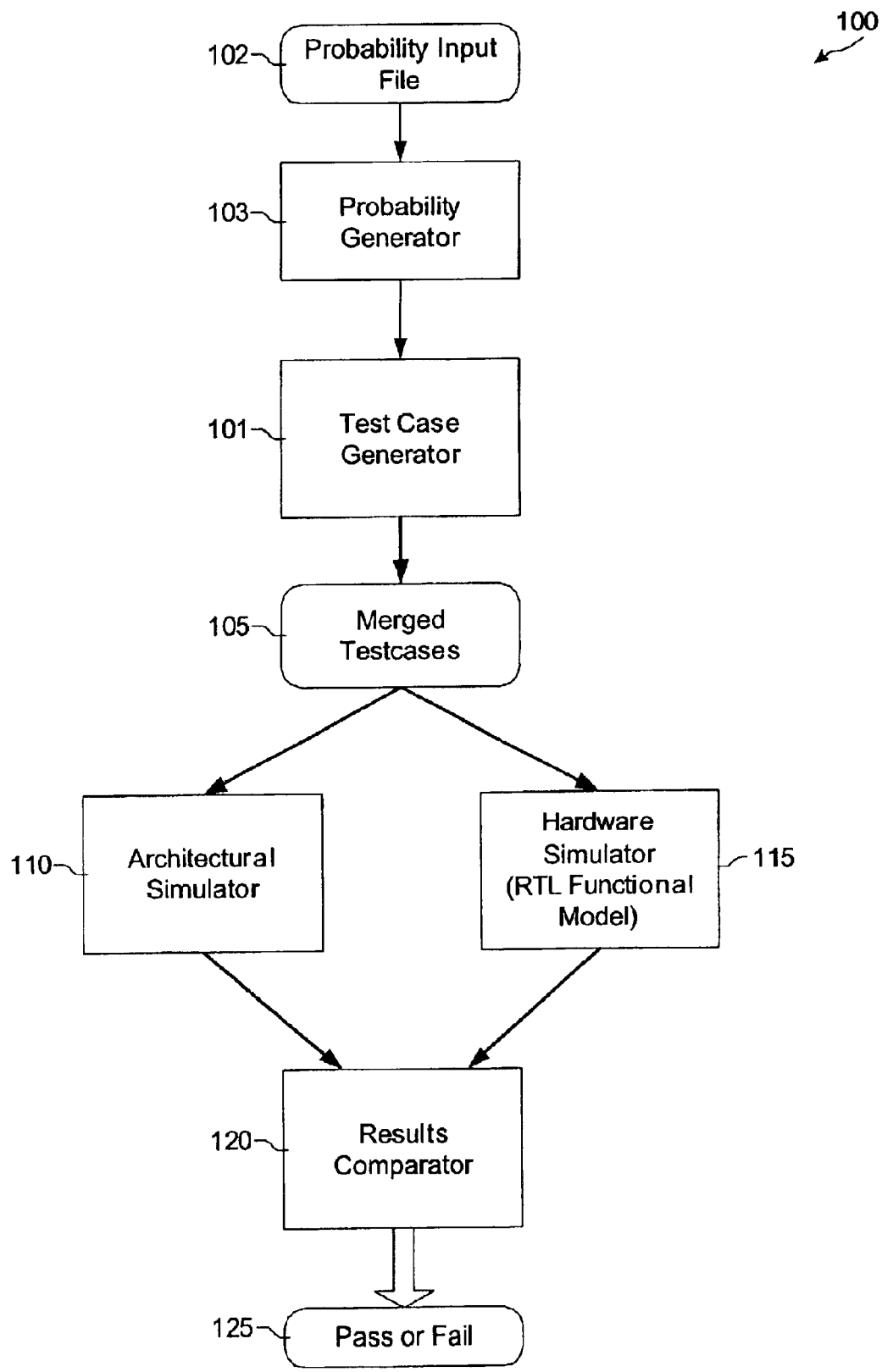
FIG. 1 is a diagram illustrating exemplary components configured in accordance with the present system.

FIG. 1 is a diagram illustrating data flow through exemplary functional components configured in accordance with the present system 100 for testing the architecture of a target computer processor. In an exemplary embodiment, the functionality for each of these components is performed by software run on a workstation. These components of the system 100 include a probability generator 103, a test case generator 101, an architectural simulator 110, a hardware simulator 115, and a results comparator 120.

The hardware simulator 115 is a software program compiled from RTL (Register Transfer Level) code representing the hardware implementation of the target processor. Two examples of RTL languages are Verilog and VHDL. The RTL code is compiled and translated into gate/transistor-level netlists. These netlists are then used to create an executable module that functions as hardware simulator 115, which simulates the exact functionality of the target processor hardware. The architectural simulator 110 is also a software program, which in the present exemplary embodiment, is written in the 'C' programming language.

Architectural simulator 110 simulates the desired target processor and implements essentially the same architectural rules as the RTL running in hardware simulator 115.

In typical operation, a multi-threaded test case is passed as input to both simulators 110/115. The multi-threaded test case comprises a plurality of individual test case threads (separately executable segments of test case code). The simulators are run synchronously and the output from both is compared. As explained below, the results comparator 120 generates a 'pass' or 'fail' result 125 indicating whether the results of the two simulators 110 and 115 are identical. The architectural simulator 110 implements the rules of the target processor architecture as simply as possible. The RTL running in hardware simulator 115, on the other hand, includes 'micro-architectural' features which optimize the speed or reliability of the hardware, such as pipelines, buffers, error-checkers, bypass signals, etc. The comparison makes sure that the hardware simulator still gets the correct results after implementing the added RTL complexity.

An extremely simplified test case example is shown below:

| Simplified Test Case Example | |
|---|---|
| Thread 0: | |
| load r1 = memory[0x11000] | |
| load r2 = memory[0x15000] | |
| r3 = add r1, r2 | |
| end | |
| Thread 1: | |
| load r1 = memory[0x21000] | |
| load r2 = memory[0x25000] | |
| r3 = add r1, r2 | |
| end | |
| 0x11000 | 0x5 |
| 0x15000 | 0x4 |
| 0x21000 | 0x3 |
| 0x25000 | 0x3 |

Output from Results Comparator 120:

| | |
|---|---|
| ... | |
| Thread1 | r3 = add r1, r2 |
| Error: | register mismatch r3: |
| RTL sim: | r3: 0x9 |
| Arch sim: | r3: 0x6 |

In the above example, the test case initializes two threads. Each thread loads two values from memory and then adds them together. The "Output from Results Comparator" shows an example of what might appear if the results from the simulators 110/115 differed. In this case, the simulators disagree about the result of the addition operation. In looking at the initial memory, it can be seen that the architectural simulator appears to have the correct answer (0x3+0x3=0x6). It can also be seen that the answer produced by the hardware (RTL) simulator, (0x9), would be the correct answer if the addition used the Thread 0 values for r1 and r2 instead of the Thread 1 values. From this observation one might suspect, e.g., that the RTL is incorrect and that it used values from the Thread 0 registers instead of the thread 1 registers for the addition.

Figure 2:
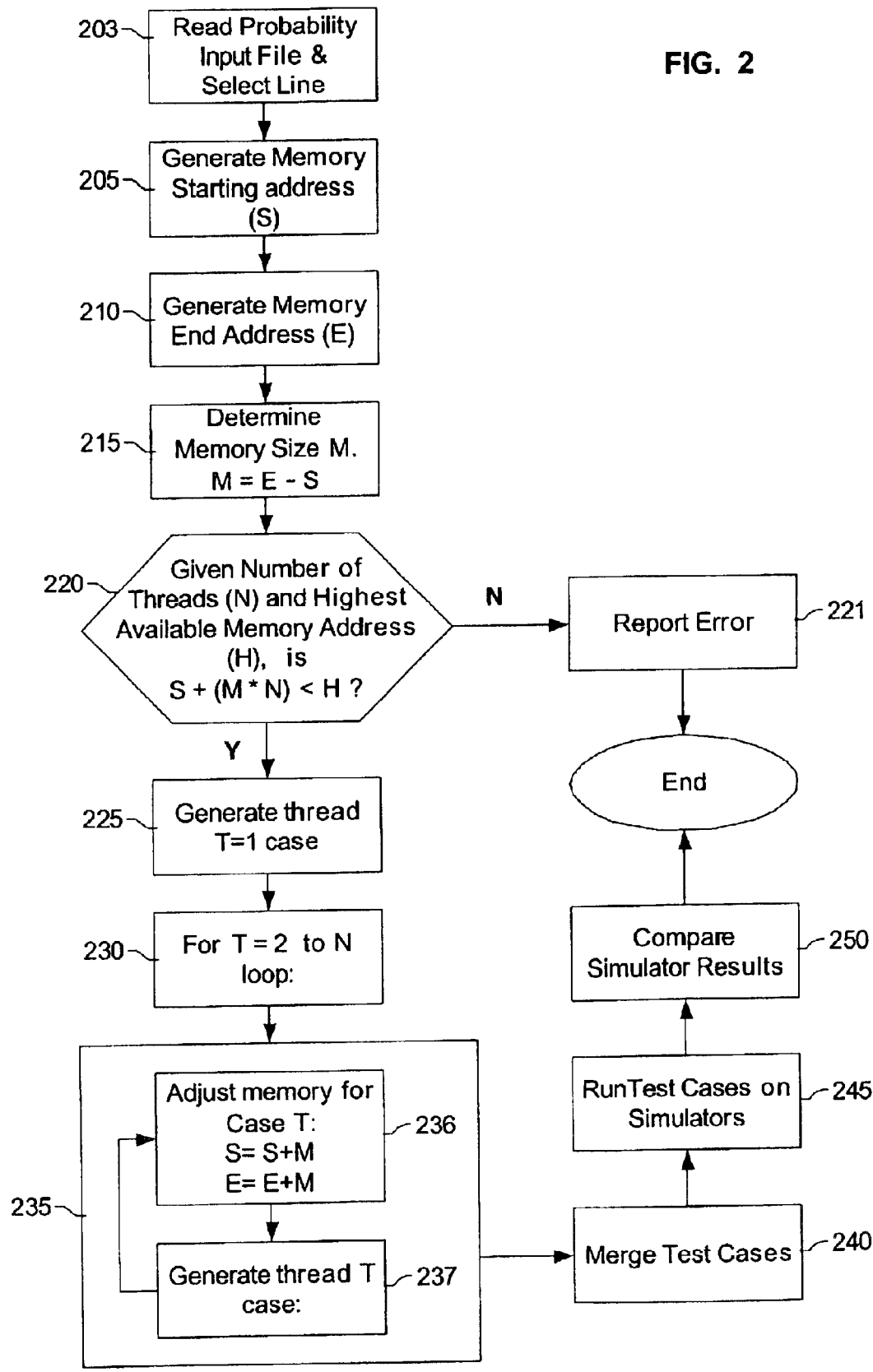
FIG. 2 is a flowchart illustrating, at a high level, steps which may be performed in practicing one embodiment of the method of the present invention.
Figure 3:
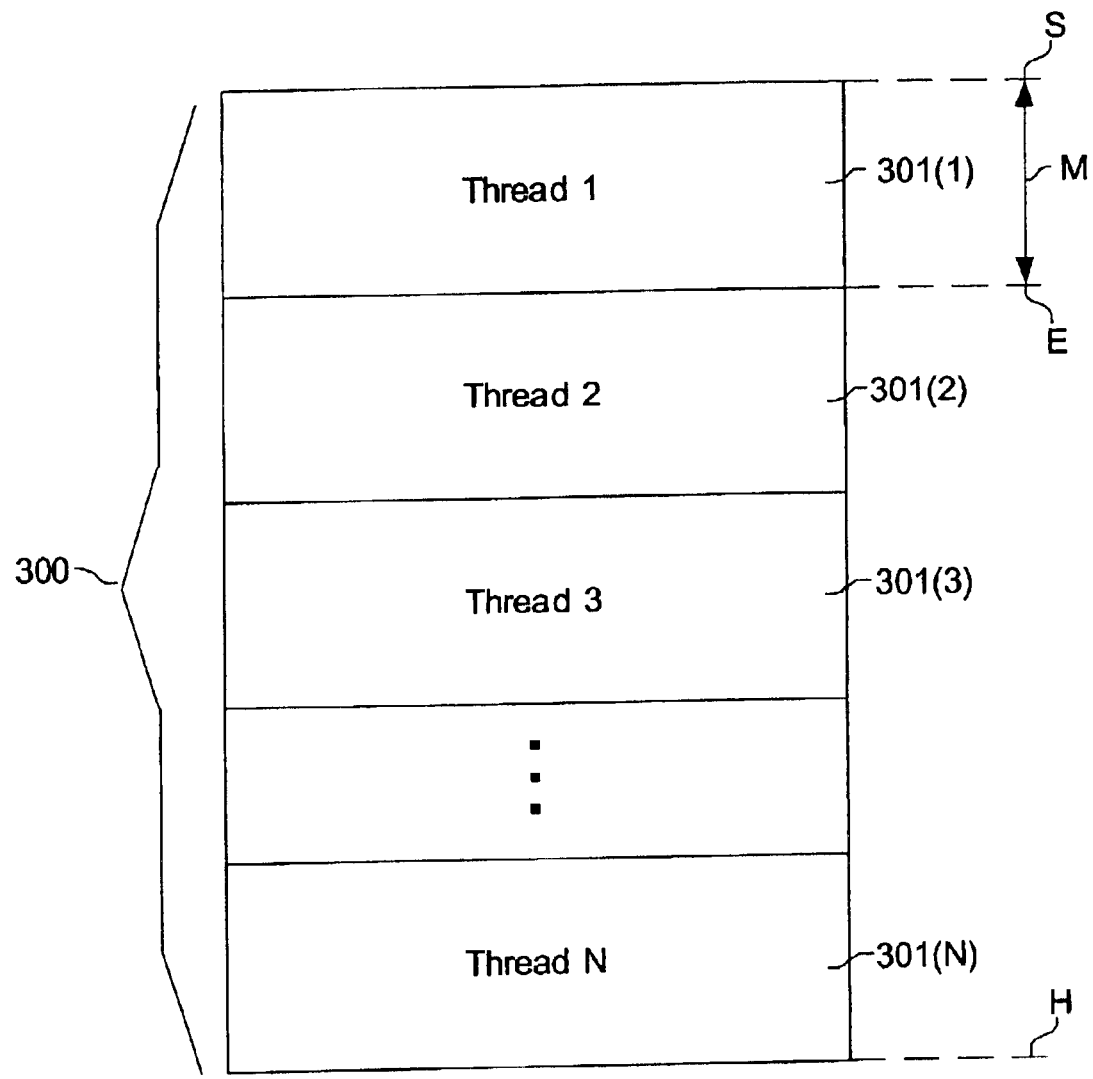
FIG. 3 is an example showing memory allocation for a multi-threaded test case.

FIG. 2 is a flowchart illustrating, at a high level, steps which may be performed in practicing one embodiment of the method of the present system. FIG. 3 is an example showing memory allocation for a multi-threaded test case for a target processor, i.e., the processor whose architecture is to be tested by simulation. Operation of the present system 100 is best understood by viewing FIGS. 1, 2, and 3 in conjunction with one another. As shown in FIG. 2, at step 203, a probability generator 203 reads a probability input file 102 containing a structure for determining the memory range for each case in the test run. As described in detail below, a 'line' containing values for determining the memory segment size for each thread (and corresponding test case) is selected from the probability input file 102. An example of a probability input file 102 and its function in generating test cases is set forth further below.

At step 205, probability generator 103 generates a starting address 'S', representing the starting memory location in memory 300 at which the first test case (Thread 1) 301 will be loaded. Address S is the start of the segment of memory from which the first test case can choose addresses for memory operations. Memory 300 represents the total memory available to the target processor. At step 210, the memory end address 'E' for the first thread 301 is generated by probability generator 103. The size of the memory segment M for each of the threads 301(1)–301(N) is then determined by subtracting starting address 'S' from end address 'E', at step 215. A given test case will only use some subset of the memory locations within the given range.

At step 220, a check is made to determine whether the total number of threads (N), each of size 'M', will fit into memory 300 between the memory starting address 'S' and the highest available memory address 'H', by determining the result of the following relation:

$$S+(M*N)<H$$

If the above relation is false (i.e., the total thread size exceeds the amount of available memory), then an error is reported at step 221. If the above relation is true, the amount of available memory 300 is sufficient to contain all of the threads 301(1)–301(N), and therefore the merged test cases 105 will fit into available memory 300. Then, at step 225, test case generator generates thread 301(1) for test case T=1. At step 230, the loop shown in block 235 is performed to generate test cases 2 through N using threads 301(2)–301(N). As shown in block 235, the size of the memory segment allocated to each test case T is determined, at step 236, by calculating a starting address S and an end address E for each test case, as indicated above with respect to step 215. Then, at step 237, test case T is generated by test case generator 101.

At step 240, test cases 1 through N are merged into a multi-threaded test case 105. At step 245, the multi-threaded test case 105 is run on an architectural simulator 110 and on an RTL functional model via a hardware simulator 115. Each test case contains the initial state to set up before running the case and the instructions to be executed. This state is initialized before each simulation is run. The output from these two simulators is compared at step 250, using results comparator 120, and any difference in results is signaled as a failure to be debugged.

The following example illustrates the generation of multiple test cases using a probability input file 102. Exemplary contents of a probability input file 102, which, in an exemplary embodiment, is used for determining the memory range for each case in a given test run, is shown below:

Line 1 25% Address 0x100000 to 0x300000 (2 megabytes)

Line 2 25% Address 0x100000 to 0x500000 (4 megabytes)

Line 3 50% Address 0x100000 to 0x900000 (8 megabytes)

Probability generator 103 selects one of the address segment lines in the file 102 based on the probabilities associated with the lines (step 203) and sets the memory start address S and end address E to the respective predetermined memory addresses in the selected line (steps 205 and 210). In an exemplary embodiment, a number from 0–99 is chosen randomly to determine which line is selected. In the above example, if the number selected is 0–24, Line 1 is used; if the number selected is 25–49, Line 2 is used; otherwise (if the number selected is 50–99), Line 3 is used. Over a large number of test runs, each line will be selected the percentage of the time specified in the probability input file 102.

In the present example, assume that Line 2 (the '4 megabytes' line) is selected. Probability generator 103 uses the information in this line to determine a value for M, the common memory segment size for each of the threads 301(1)–301(N), by subtracting starting address S from end address E (step 215):

S=0x100000

E=0x500000

M=0x500000−0x100000=0x400000

Assume there are 4 threads (N=4), and that the highest memory address available is H=0x2000000. Before proceeding, a check is made to verify that the total number of threads (N) will fit into memory 300 between the memory starting address 'S' and the highest available memory address 'H', [i.e., S+(M*N)<H] (step 220):

0x100000+(0x400000*4)=0x1100000, which is less than 0x2000000.

Next (step 225), the T=1 case is generated using the original values for S and E supplied by the probability generator.

For threads T=2 to N, the values of S and E are adjusted by adding M to each value (block 235):

T=2:

S=0x100000+0x400000=0x500000

E=0x500000+0x400000=0x900000

T=3:

S=0x500000+0x400000=0x900000

E=0x900000+0x400000=0xd00000

T=N (=4):

S=0x900000+0x400000=0xd00000

E=0xd00000+0x400000=0x1100000

At this point, the block 235 loop is completed and the individual test cases are then merged into a single test case (step 240).

While exemplary embodiments of the present invention have been shown in the drawings and described above, it will be apparent to one skilled in the art that various embodiments of the present invention are possible. For example, the configuration of system components shown in FIG. 1, as well as the specific set of steps shown in FIG. 2, and the examples used herein, should not be construed as limited to the specific embodiments described in this document. Modification may be made to these and other specific elements of the invention without departing from its spirit and scope as expressed in the following claim

What is claimed is:

1. A method for generating a plurality of non-overlapping executable threads for test cases used in a computer architecture simulation for a target processor, the system comprising the steps of:

setting, to predetermined values, a segment starting address and a segment end address for a first memory segment;

determining a common memory segment size for each of a plurality of memory segments by subtracting said segment starting address from said segment end address;

determining the location of the remaining said memory segments in said plurality, each of which has a segment end address determined by the common memory segment size, by adding an additional segment of memory, having said common memory segment size, contiguously to said segment end address of the previously determined said memory segment; and generating each of said executable threads such that it occupies at least part of a respective one of said plurality of memory segments.

2. The method of claim 1, including the additional steps of:

determining whether all of the memory segments will fit into the total memory available to the target processor; and performing the determining and generating steps on the condition that all of the memory segments will fit into the into the total memory available to the target processor.

3. The method of claim 1, including the additional step of establishing said predetermined values by selecting an address segment line from a probability input file.

4. The method of claim 3, including the additional step of merging all of said executable threads to create a merged test case.

5. The method of claim 4, including the additional steps of:

running said merged test case on a hardware simulator to produce a first output;

running said merged test case on an architectural simulator to produce a second output;

comparing the first output with the second output; and reporting an error if a difference exists between the first output and the second output.

6. A system for generating a plurality of non-overlapping executable threads for use in a computer architecture simulation, the system comprising the steps of:

selecting an address segment line from a probability input file to determine a memory starting address and a memory end address for a memory segment for containing a first one of said executable threads;

determining a common memory segment size for each of said executable threads by subtracting the memory starting address from the memory end address;

successively determining additional memory segments for containing respective ones of the remaining said executable threads in said plurality thereof, wherein each successively determined said additional memory segment occupies a segment of memory contiguous to said memory end address for the previously generated said memory segment, and wherein the memory end address for each additional said memory segment is determined by the common memory segment size; and generating each of said plurality of non-overlapping executable threads in a respective one of said additional memory segments.

7. The system of claim 6, wherein the steps of successively determining and generating are performed on the condition that all of the memory segments will fit into the into the total memory available to the target processor.

8. The system of claim 6, including the additional step of merging all of said executable threads to create a merged test case.

9. The system of claim 8, including the additional steps of:

running said merged test case on a hardware simulator to produce a first output;

running said merged test case on an architectural simulator to produce a second output;

comparing the first output with the second output; and reporting an error if a difference exists between the first output and the second output.

10. A system for generating a plurality of executable threads, and merging the threads into a single multi-threaded test case in a computer architecture simulation for a target processor, the system comprising:

a probability generator for selecting an address segment line from a probability input file to determine a memory starting address and a memory end address for a memory segment for containing a first one of said executable threads;

a test case generator for:
        generating each of said plurality of executable threads in accordance with a common memory segment size determined by subtracting the memory starting address from the memory end address; and
        merging the plurality of executable threads into a merged test case;

an architectural simulator, implementing a first set of architectural rules for the target processor, for executing the merged test case to generate a first result;

a hardware simulator, implementing a second set of architectural rules for the target processor, for executing the merged test case generate a second result; and a results comparator for performing a comparison of said first result and said second result, and signaling any difference in results therebetween.

11. The system of claim 10, wherein said plurality of executable threads are generated in successively determined memory segments, and wherein each successively determined said additional memory segment occupies a segment of memory contiguous to said memory end address for the previously generated said memory segment, and wherein the memory end address for each additional said memory segment is determined by the common memory segment size.

12. The system of claim 11, wherein all of said executable threads are merged to create a merged test case.

13. The system of claim 12, wherein:

said merged test case is executed on a hardware simulator to produce a first output;

said merged test case is executed on an architectural simulator to produce a second output;

the first output is compared with the second output; and an error is reported if a difference exists between the first output and the second output.

14. A system for generating a plurality of non-overlapping executable threads for use in a computer architecture simulation, the system comprising:

means for selecting an address segment line from a probability input file to determine a memory starting address and a memory end address for a memory segment for containing a first one of said executable threads;

means for:
determining a common memory segment size for each said executable thread by subtracting the memory starting address from the memory end address; and successively determining additional memory segments for containing respective ones of the remaining said executable threads in said plurality thereof, wherein each successively determined said additional memory segment occupies a segment of memory contiguous to said memory end address for the previously generated said memory segment, and wherein the memory end address for each additional said memory segment is determined by the common memory segment size; and means for generating each of said plurality of non-overlapping executable threads in a respective one of said additional memory segments.

15. The system of claim 14, wherein all of said executable threads are merged to create a merged test case.

16. The system of claim 15, wherein said merged test case is executed on a hardware simulator to produce a first output;

said merged test case is executed on an architectural simulator to produce a second output;

the first output is compared with the second output; and an error is reported if a difference exists between the first output and the second output.

* * * * *

UNITED STATES PATENT AND TRADEMARK OFFICE
CERTIFICATE OF CORRECTION

PATENT NO.         : 6,845,440 B2
APPLICATION NO. : 10/291936
DATED              : January 18, 2005
INVENTOR(S)       : Ryan C. Thompson et al.

Page 1 of 1

It is certified that error appears in the above-identified patent and that said Letters Patent is hereby corrected as shown below:

Column 5, line 9, delete "claim" and insert therefor --claims.--

IN THE CLAIMS

Claim 7, Column 6, line 16, delete "into the"

Signed and Sealed this

Nineteenth Day of June, 2007

JON W. DUDAS
*Director of the United States Patent and Trademark Office*